Figure 3:
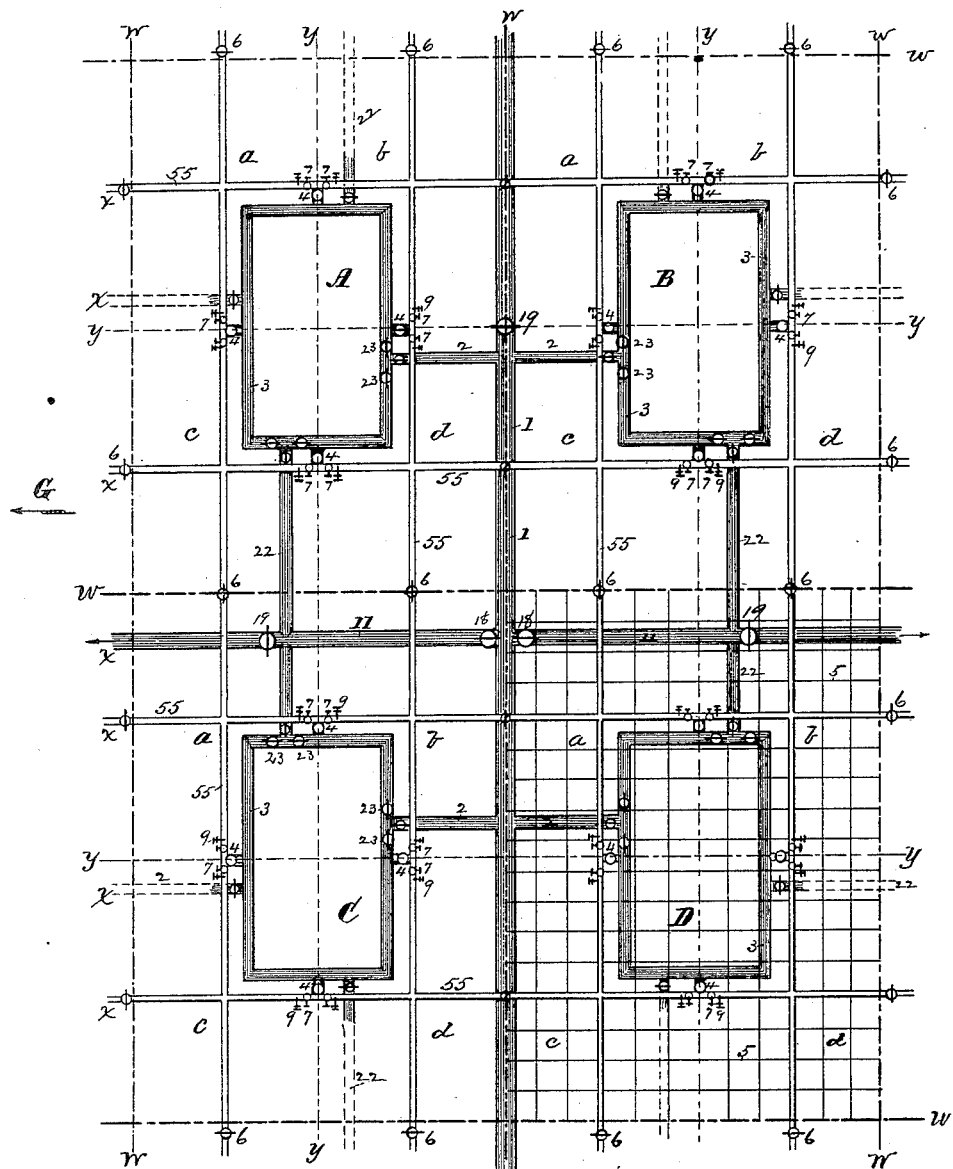

(No Model.)   4 Sheets—Sheet 1.
J. C. CONROY.
SYSTEM FOR DISTRIBUTING GAS.
No. 426,172.   Patented Apr. 22, 1890.
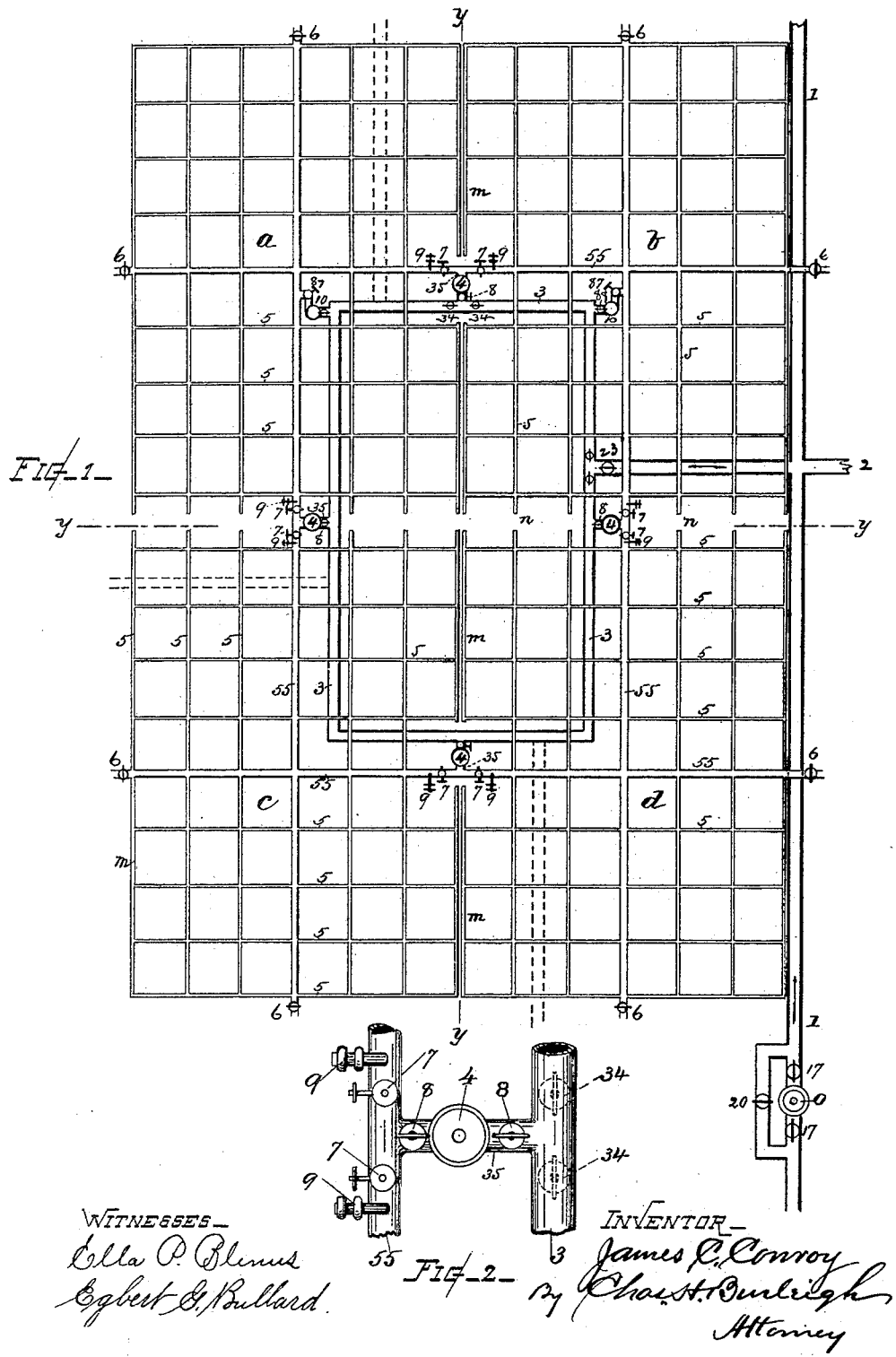
WITNESSES
Ella P. Blinns
Egbert G. Bullard
INVENTOR
James C. Conroy
By Chas. H. Burleigh
Attorney (No Model.) 4 Sheets—Sheet 2.
J. C. CONROY.
SYSTEM FOR DISTRIBUTING GAS.

No. 426,172. Patented Apr. 22, 1890.

WITNESSES  
INVENTOR  
James C. Conroy  
By Chas. H. Burleigh  
Attorney (No Model.) 4 Sheets—Sheet 4.

J. C. CONROY.
SYSTEM FOR DISTRIBUTING GAS.

No. 426,172. Patented Apr. 22, 1890.

WITNESSES
Ella P. Blenus
Egbert E. Bullard

INVENTOR
James C. Conroy
By Chas. H. Burleigh
Attorney

UNITED STATES PATENT OFFICE.

JAMES C. CONROY, OF PITTSBURG, PENNSYLVANIA, ASSIGNOR OF ONE-HALF TO THE UNION WATER METER COMPANY, OF WORCESTER, MASSACHUSETTS.

SYSTEM FOR DISTRIBUTING GAS.

SPECIFICATION forming part of Letters Patent No. 426,172, dated April 22, 1890.

Application filed March 23, 1889. Serial No. 304,547. (No model.)

*To all whom it may concern:*

Be it known that I, JAMES C. CONROY, a citizen of the United States, residing at Pittsburg, in the county of Allegheny and State of Pennsylvania, have invented certain new and useful Improvements in Systems for Distributing Gas, of which the following, together with the accompanying drawings, is a specification sufficiently full, clear, and exact to enable persons skilled in the art to which this invention appertains to make and use the same.

The object of my present invention is to provide an efficient and economical means or plant for the distribution of gas in cities and towns, more especially where natural gas, or gas primarily supplied under high pressure, is employed, the same being adapted to give a properly-reduced pressure in the distributing-pipes and to afford an ample, though not excessive, supply of gas under substantially uniform and constant pressure at the various points of consumption throughout the town or districts.

Another object is to provide a gas-distributing plant in which the distributing-pipes are arranged in a system of separate districts or sections, having arterial mains or feeders with stop-gates connecting the several districts, and into which the gas is delivered through reducing-regulators from high-pressure supply-pipes in circuits, each of which supplies a series of the distributing-districts and which receives the gas from the chief main or prime leader pipe after it has passed through a high-pressure reducing-regulator, as more fully hereinafter explained.

Another object of my invention is to provide a plant or system of piping for natural gas, in which a series of districts or sections of piping for low-pressure distribution are employed in connection with a high-pressure supply service arranged in circuits, and having a series of reducing regulators and means for severally cutting off the separate low-pressure distributing-sections, all arranged in such manner that any individual distributing-section can be cut off at will without injuriously effecting the uniformity of distribution or pressure in the other sections or districts.

I employ in an improved form a double system of piping comprising lines of distributing-pipes, from which the gas at ordinary low pressure is supplied to consumers, and lines of high-pressure supply-pipes from which the gas at a moderately high pressure is conducted to the various supply-stations and delivered through reducing-regulators into said distributing or low-pressure pipes. The territory covered by the plant is divided into a series of blocks or separate distributing-sections, each covering a district of moderate area, within which the low-pressure distributing-pipes are all connected with each other at intersecting points, but are separated from those in other sections, except certain arterial mains or feeders, which are provided with stop-gates, while the supply-circuits or high-pressure pipes are disposed in relation to such distributing sections or districts, so that each distributing section or district can receive gas through reducing-regulators from said high-pressure supply at two or more places, and the pipes are provided with valves or gates disposed in such manner as will facilitate the separate shutting off of any particular section of distributing-pipes without interfering with the operation of the regulator or stopping the flow of gas into the adjacent section or district. Further, in connection with the gates for cutting out the several distributing-districts I employ gate-operating mechanism, which is preferably arranged for automatic action and connected by electric circuits or wires with the central gas-office, from which the gates or valves of any section or district can be instantly operated for cutting off the supply of gas to such distributing-section.

The pipes of the low-pressure sections have main feeders or arterial pipes provided with stop-gates that connect one district or section with another in both directions, so that in case it is desired gas can flow from one low-pressure distributing-section into another. This feature of cross-connection is also employed in some cases in the high-pressure supply-sections. The supply of gas to the high-pressure circuits or sections is carried from the well or source of supply by a chief main and a series of branch mains, the maximum pressure of the well being reduced by a suitable regulator located outside the city limits to that pressure desired for the high-pressure circuits, which pressure should be within the limit of safety for conveying gas in pipes throughout the town.

Figure 4:
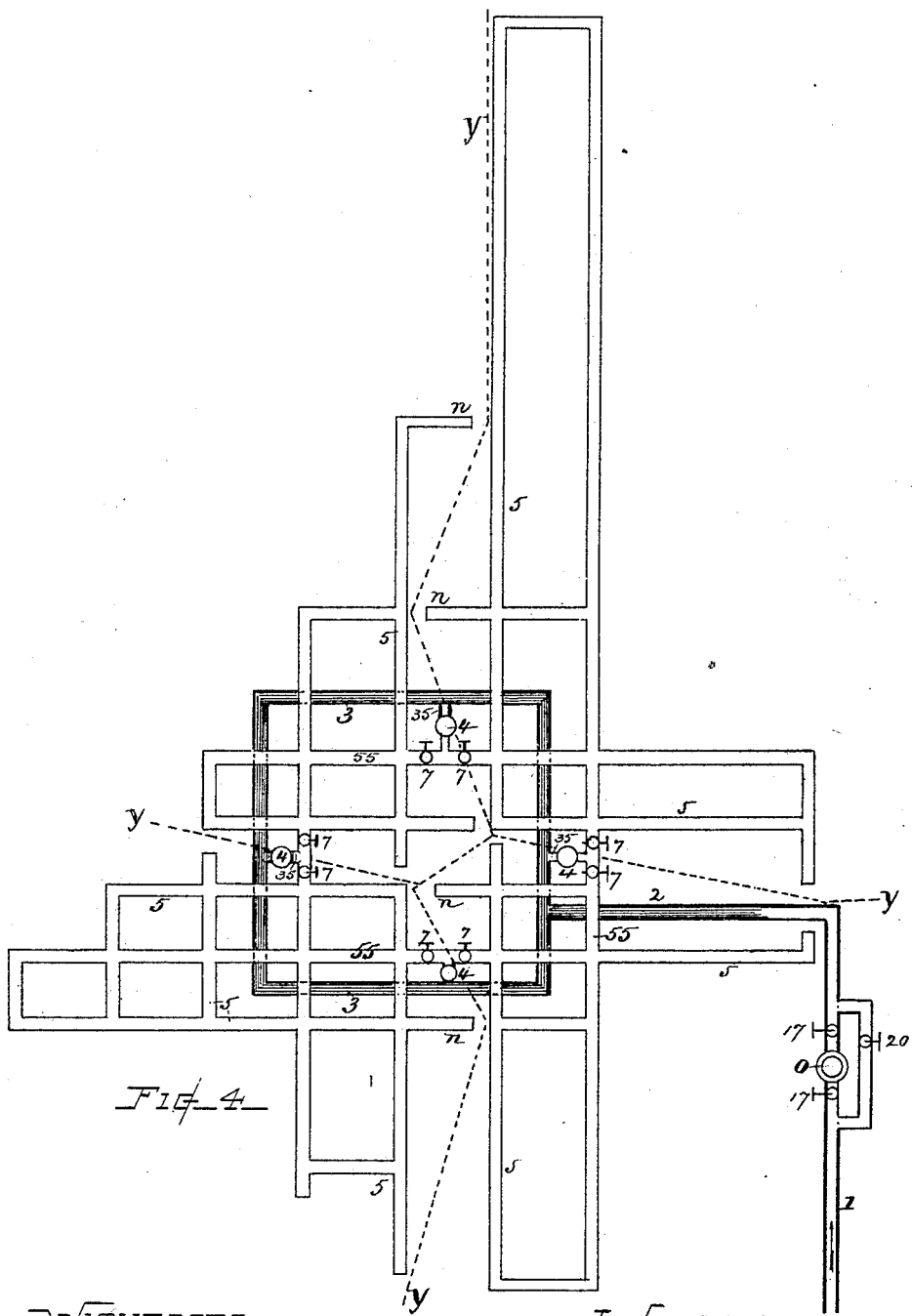
Figure 5:
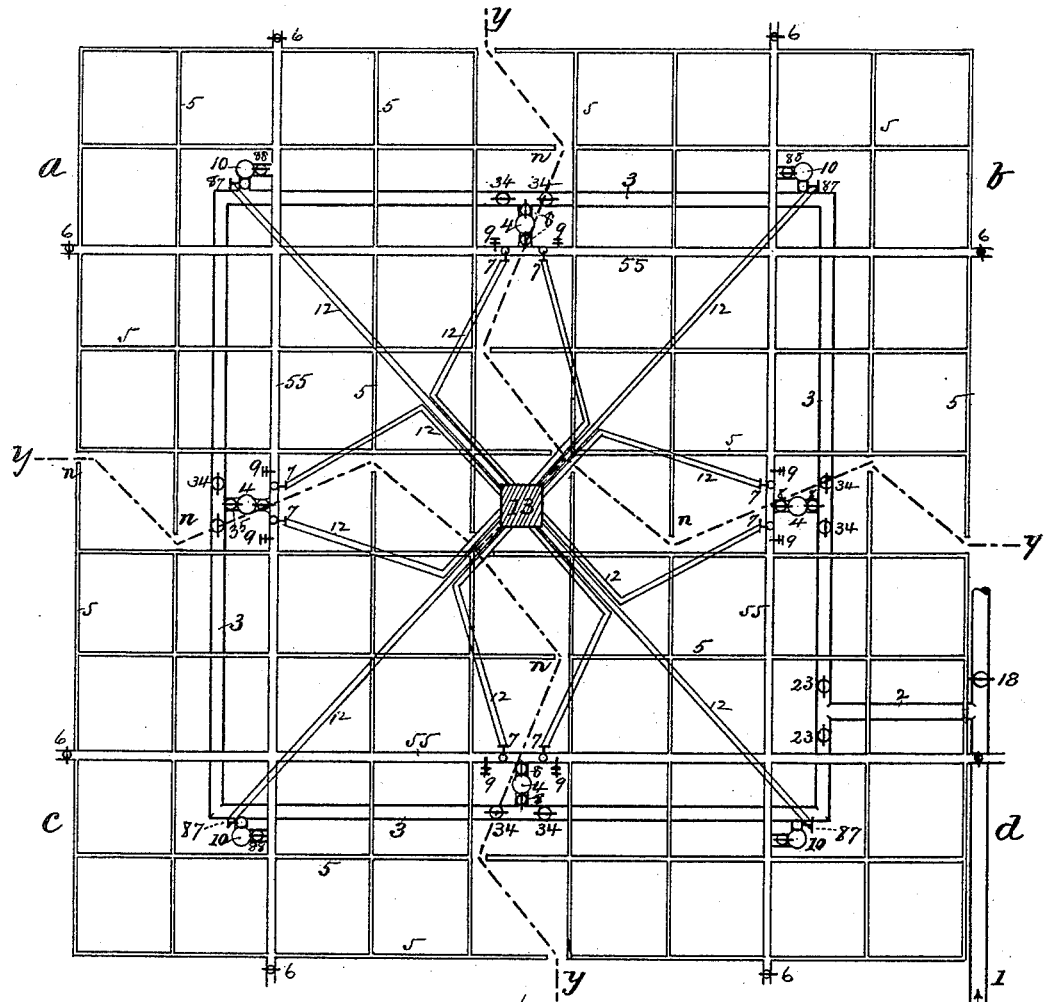
Figure 6:
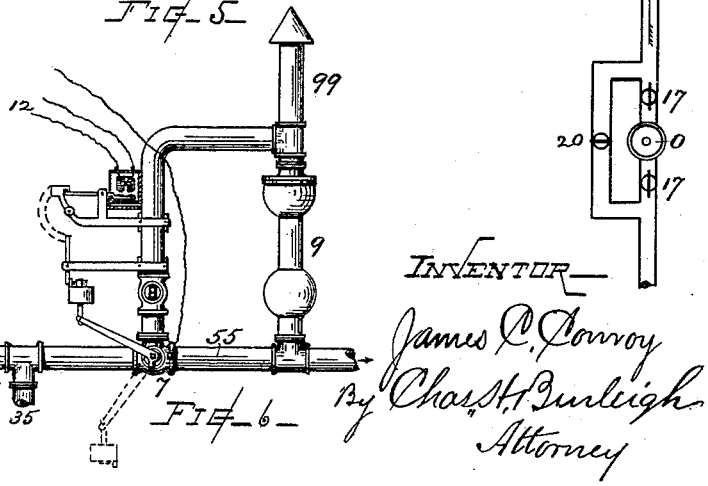

In the drawings, Figure 1 is a plan diagram illustrating the nature of my invention and representing one of my high-pressure circuits, together with the lines of distributing-pipes or street-mains corresponding to the several crossed streets in a portion of a city, showing, in a general way, the manner in which the distributing-pipes are separated into blocks, sections, or districts, and the disposition and arrangement of the pressure-reducing regulators, connections, and stop-gates for delivering and controlling the supply of gas from said high-pressure circuit to the distributing system. Fig. 2 is a plan view showing the relative arrangement of the regulator, stop-gates, and safety-valves with the high-pressure and low-pressure pipes. Fig. 3 is a diagram showing my plan of arranging any desired number of high-pressure supply-circuits in connection with the chief main leading from the source of supply and the series of arterial mains or feeders in the low-pressure systems, also indicating the manner in which the system can be extended to keep pace with the enlargement and growth of the town. The lines of low-pressure distributing-pipes other than the main feeders have been, except in one quarter, omitted in this view, owing to the extreme reduction of scale necessary to bring the view within the limit of the drawing sheet. Fig. 4 is a plan diagram showing my invention as applied in an irregular-shaped town of moderate extent. Fig. 5 is a diagram illustrative of the manner in which the several sections or districts are arranged to facilitate shutting off by automatically operating stop-gates and electric or other connection from the general gas-office. Fig. 6 is a side view of the pressure-relief device and an automatic-operating mechanism for closing the valves or gates of the distributing-sections by electric connection.

In referring to the drawings, 1 denotes the chief main leading from the natural-gas well or other source of gas-supply, the same being provided with a suitable reducer or pressure-regulator O for reducing the pressure of gas coming from the well down to a moderately high pressure—say ten pounds per square inch in excess of atmospheric pressure, at which it can safely be carried in pipes within the town.

2 indicates branch mains leading to high-pressure pipes or circuits 3, from which the gas is supplied through reducers or regulators 4 to the distributing-pipes which are laid in the streets, and from which consumers are supplied with gas in ordinary manner.

A, B, C, and D indicate the major sections or separate divisions of distribution, (see boundary-lines $w\,w$,) which major sections are subdivided into minor sections or districts $a, b, c,$ and $d$, (see boundary-lines $y$,) each of which embraces a convenient number of streets—say from six to twenty streets, more or less, in each direction—and includes all of the distributing-pipes 5 in said streets running in both directions, such distributing-pipes 5 being preferably all connected with each other at their several junctions or crossings within the district, but disconnected or separate from those of other adjacent districts or minor sections, except in cases of certain arterial pipes or feeders 55, which latter connect from one section to another, but are provided with stop-gates, as at 6, by means of which communication between adjacent sections can be opened or stopped, as desired. The gates 6 may be kept closed in the normal working of the plant.

At the limits or boundaries of the separate districts $a, b, c,$ and $d$ two lines of distributing-pipes 5 are laid in a single street, as at $m$, one pipe connecting the cross-pipes in one section and the other pipe connecting those of the other section; or, if preferred, the sections can be divided by forming dead ends on the several distributing-pipes, as at $n$. The high-pressure pipes 3 are best disposed in circuits that correspond with the major sections A, B, C, and D of the low-pressure distributing system, the pipe 3 being preferably arranged in a square or lay-out that substantially conforms to the lay-out of the main feeder-pipes 55 in the low-pressure system and connected so that gas can flow in either direction around the circuit, the cross-connections and regulators being located at intermediate stations on the sides of this square or circuit. The individual sections are arranged in a manner to receive gas at two or more points through the regulators 4 from the high-pressure pipe 3, and are severally provided with valves or gates 7 for shutting off either of the distributing-sections or stopping the regulators from delivering gas into the low-pressure pipes. The four places where the regulators and supply-connections are located correspond with the dividing lines between adjacent sections or districts.

The pressure-regulators employed at the several stations 4, and also the stop-gates used in the lines of piping, may be of any suitable well-known construction.

The plans herewith presented are necessarily drawn to so small a scale that they cannot show the regulators and valves in connection, except by mere indication of their relative positions. The preferred way to dispose them is to set the regulators in a chamber at the center of the street, with a gate or valve 8 at each side of the regulator 4, and the gates or valves 7 in the low-pressure feeder-pipe 55 close to each side of the T on the connection 35 that joins the regulator therewith, substantially as indicated in Fig. 2. The regulators in every case feed from the high-pressure circuits into the large or arterial pipes 55 of the low-pressure system, and said large pipes feed the small pipes 5 in the several streets. The pipes 55, while they serve as arteries or main feeders for the system of distributing-pipes 5, also serve as distributing-pipes for the streets through which they are respectively located.

The stop-gates 7 being located in the feeders 55 at each side of the supply-connection 35, the feed of gas toward either section can be cut off without preventing the flow through the regulator and connection into the adjacent section or district. By this arrangement of the supply-connections, regulators, and stop-gates it will be observed that each distributing-section can receive gas from the supply-circuit 3 at two places on the different boundary-lines of the sections or districts, and a single regulator at each position serves to feed either or both of two adjacent sections. This is a feature of great practical utility and convenience in the working of the plant. In some instances, if desired, or in cases where the distributing-sections are of large area, additional supply-connections and regulators 10 can be employed for connecting the low-pressure system with high-pressure supply, said connections being provided with suitable stop-gates, as indicated at 87 and 88. The main low-pressure feeders 55 are best provided with safety-valves 9, which are preferably located near the gates 7 and provided with escape-pipes 99. (See Fig. 6.) Said safety-valves may be such as described in my Letters Patent No. 401,136, or of other suitable construction.

In large cities the chief main is best extended through the center of the town, and lateral branches 11 carried therefrom to the right and left, as shown in Fig. 3. From said main and branches the connecting-mains 2 and 22 are carried to the various high-pressure circuits 3 that deliver gas to the low-pressure distributing-sections. By this arrangement it will be seen that the high-pressure circuits 3 can be supplied with gas at several points, so that no inconvenience is occasioned from the closing off of any part of the system for repairs. Stop-gates 34 and 23 can be employed in the circuits 3, and other stop-gates 17, 18, 19, and 20 can be provided at positions where indicated for controlling the flow of gas in the mains, as required.

The gates 7 and 87, while they can be opened and closed by hand when desired, are preferably provided with suitable automatic actuating and closing mechanism connected by pneumatic tubes, wires, or electric circuits 12, that run from the several gates to the general gas-office 13, so that the gates of any section or district can be instantly closed when desired for isolating any particular district in case of a fire or other accident occurring in such district.

In a town having its distributing-plant disposed in the manner illustrated the blocks can be extended by connecting and continuing the high-pressure pipes and the main feeders 55 in the order of the squares or sections and adding thereto new sections of low-pressure distributing-pipes as the town extends and includes increased area. Thus, for instance, if the town enlarges in the direction indicated at G in Fig. 3 the pipes at x x are carried forward and the low-pressure pipes 5 of a new district are laid, as required, the same being combined with a new high-pressure circuit having the regulators disposed the same as those shown. This system of enlargement and extension can be indefinitely carried forward, adding new districts of distributing-pipes as required to meet the growth of the town without detracting from the general efficiency of the plant or interfering with the working of such sections as are already completed.

Among the advantages of my improved plant may be mentioned its great economy, as I accomplish more and afford a more efficient and uniform service with four-inch or six-inch pipes when arranged in accordance with my invention than can be done with pipes of eight, ten, or twelve inches diameter arranged as heretofore practiced, thus making a comparative saving of about forty per cent. in the weight and cost of pipes in favor of my improved method.

Any district or section of the city can be shut off in case of a fire or any other accident, and in connection with the electric circuits this can be accomplished instantly from a central office or station; or the shutting off may be performed by hand.

The plant can be practically extended without impairing its efficiency to meet the growth of the city in any direction by adding new blocks or sections of high-pressure circuits, feeder-pipes, and distributing-pipes in the order shown and described.

With the distributing-plant arranged as above described manufactured gas can be used in the same way as natural gas, the holders or gasometers taking the place of gas-wells, and in any case if the gas-supply gives out from the natural source manufactured gas can be substituted with but little expense.

In towns now supplied with gas-plants the existing street-pipes can be used for the low-pressure distributing system by separating or stopping off the pipes, so as to divide the distributing-plant into districts or sections and then combining therewith the high-pressure circuits, feeder-mains, supply-pipes, and reducing-regulators, as described.

I am aware that high-pressure pipes and low-pressure pipes with reducing-regulators have been heretofore employed in the distribution of gas, and also that systems of gas-distribution have been divided into separate sections or blocks; hence it will be understood that I do not claim such features, broadly, as of my invention; but so far as I have knowledge none of such former systems of distri-

I claim as my invention, to be secured by Letters Patent—

1. The combination, substantially as described, of the chief main 1, the high-pressure supply-circuits 3, connected therewith by branch mains 2, the low-pressure distributing-pipes 5, divided into separate sections or districts with main feeder-pipes 55, connections from said high-pressure circuits into said feeder-pipes in the respective distributing-sections having pressure-reducing regulators and stop-gates for independently isolating or closing off each section, all substantially as and for the purpose set forth.

2. In a plant for the distribution of gas, the arrangement, substantially as described, of the high-pressure service disposed in connected circuits of piping, the series of low-pressure pipes disposed in separate districts, the system of main feeders 55, crossing the several districts, said main feeders connected in each district for receiving gas from the high-pressure circuit-pipe, pressure-reducing regulators disposed in the connections, the series of gates 7, with automatic operating mechanism for closing off the individual districts, actuating connections for controlling the respective gate-operating mechanisms, the relief-valves 9, and the stop-gates 6, for the purposes set forth.

Witness my hand this 11th day of March, A. D. 1889.

JAMES C. CONROY.

Witnesses:
MELVIN M. BROOKS,
CHAS. F. CONROY.